US008001996B2

(12) United States Patent
Paulshus et al.

(10) Patent No.: US 8,001,996 B2
(45) Date of Patent: Aug. 23, 2011

(54) COMPOSITE PIPE AND A METHOD OF MANUFACTURING A COMPOSITE PIPE

(75) Inventors: Bjorn Paulshus, Skedsmokorset (NO); Tor-Oystein Carlsen, Oslo (NO); Turid Storhaug, Oslo (NO); John Magne Johnsen, Stabekk (NO)

(73) Assignee: Aker Kvaerner Subsea AS, Lysaker (NO)

( * ) Notice: Subject to any disclaimer, the term of this patent is extended or adjusted under 35 U.S.C. 154(b) by 806 days.

(21) Appl. No.: 11/663,260

(22) PCT Filed: Sep. 27, 2005

(86) PCT No.: PCT/NO2005/000359
§ 371 (c)(1),
(2), (4) Date: Mar. 20, 2007

(87) PCT Pub. No.: WO2006/036068
PCT Pub. Date: Apr. 6, 2006

(65) Prior Publication Data
US 2008/0087351 A1    Apr. 17, 2008

(30) Foreign Application Priority Data
Sep. 27, 2004    (NO) .................................. 20044086

(51) Int. Cl.
*F16L 9/00* (2006.01)
(52) U.S. Cl. ... 138/109; 138/141; 138/153; 138/DIG. 5; 277/652; 285/259

(58) Field of Classification Search ............. 138/DIG. 5, 138/109, 141, 153; 277/652; 285/259; 166/242.2, 166/242.4
See application file for complete search history.

(56) References Cited

U.S. PATENT DOCUMENTS

| | | | | |
|---|---|---|---|---|
| 3,537,484 A | * | 11/1970 | McLarty | 138/109 |
| 4,234,368 A | * | 11/1980 | Schwarz | 156/91 |
| 4,537,223 A | * | 8/1985 | Sumitani | 138/139 |
| 5,443,099 A | * | 8/1995 | Chaussepied et al. | 138/109 |
| 5,483,894 A | * | 1/1996 | Facciano et al. | 102/293 |
| 6,042,152 A | | 3/2000 | Baldwin et al. | |
| 6,050,612 A | | 4/2000 | Wolterman | |
| 6,360,781 B1 | * | 3/2002 | Braad | 138/109 |
| 6,719,058 B2 | | 4/2004 | Salama | |

(Continued)

FOREIGN PATENT DOCUMENTS
EP    0907049 A2    4/1999

*Primary Examiner* — James F Hook
(74) *Attorney, Agent, or Firm* — Birch, Stewart, Kolasch & Birch, LLP

(57) ABSTRACT

A composite pipe having at least one metal end piece (2, 3) with a free end and a non-metal tubular component (10). The tubular component (10) is coupled to the at least one end piece (2, 3) opposite of the free end of the end piece (2, 3), by means of at least one peripherally extending, axially acting groove (6, 7) that the non-metallic tubular component (10) engages. The non-metallic tubular component (10) generally comprises axial fibers (11) extending down into the at least one groove (6, 7). The groove (6, 7) has a bottom (13) and a flank (14), which flank is located furthest away from the free end of the end piece (2, 3). Between the flank (14) and the axial fibers (11) there is provided an intermediate layer (15). Also described is a method of manufacturing such a composite pipe.

10 Claims, 4 Drawing Sheets

U.S. PATENT DOCUMENTS

| | | |
|---|---|---|
| 6,863,279 B2 | 3/2005 | Salama |
| 7,631,667 B2 * | 12/2009 | Brink et al. .................. 138/109 |
| 2003/0106685 A1 | 6/2003 | Salama et al. |
| 2003/0107186 A1 | 6/2003 | Salama |
| 2004/0086341 A1 | 5/2004 | Salama et al. |

* cited by examiner

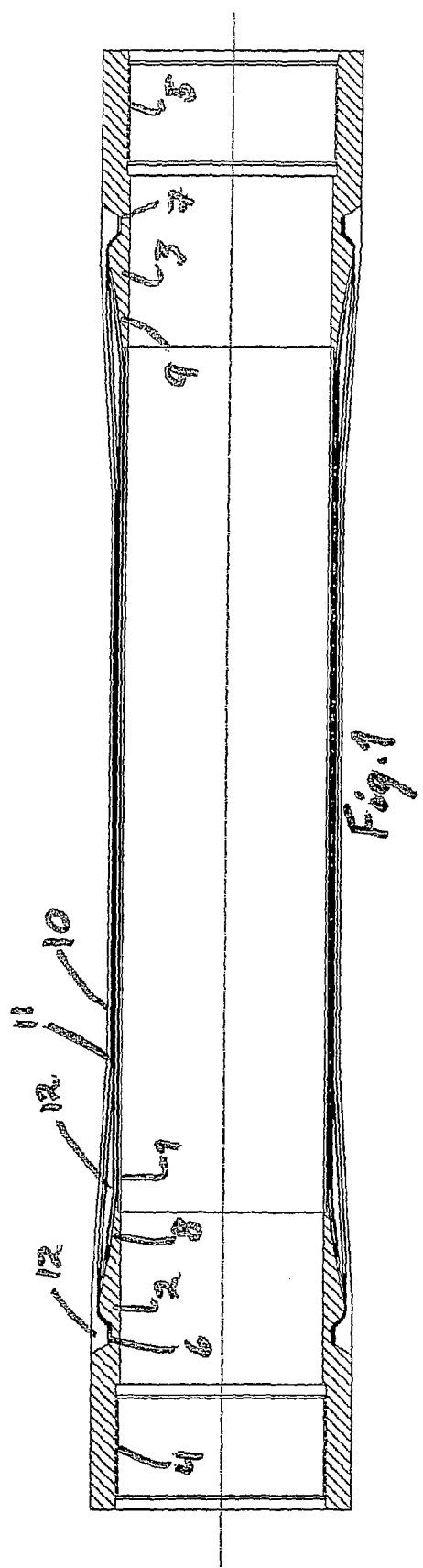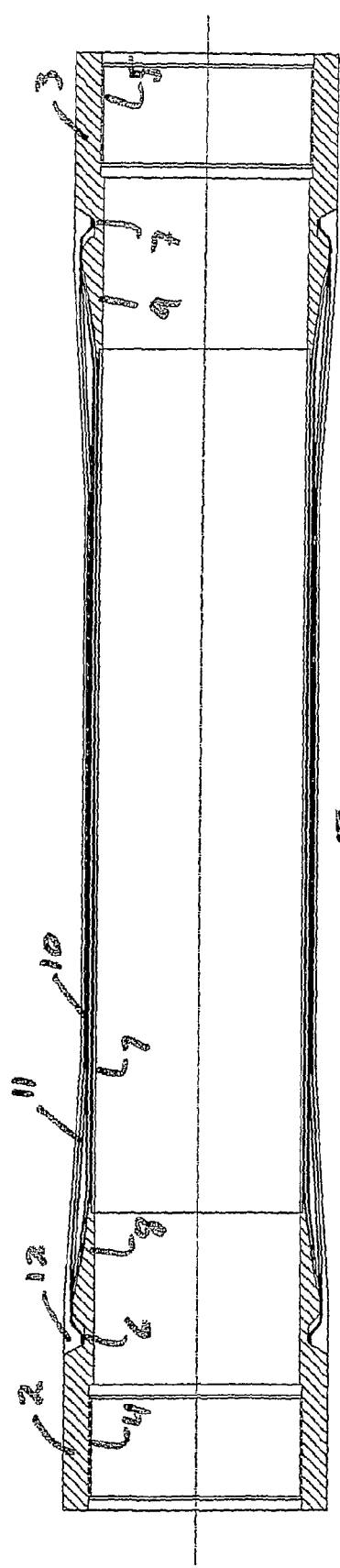

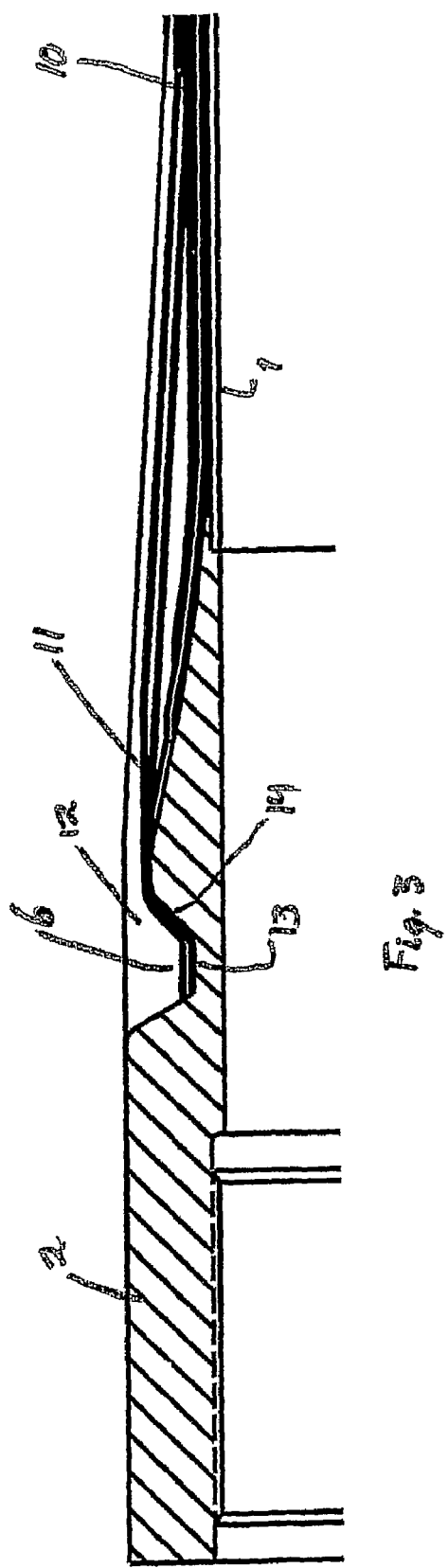
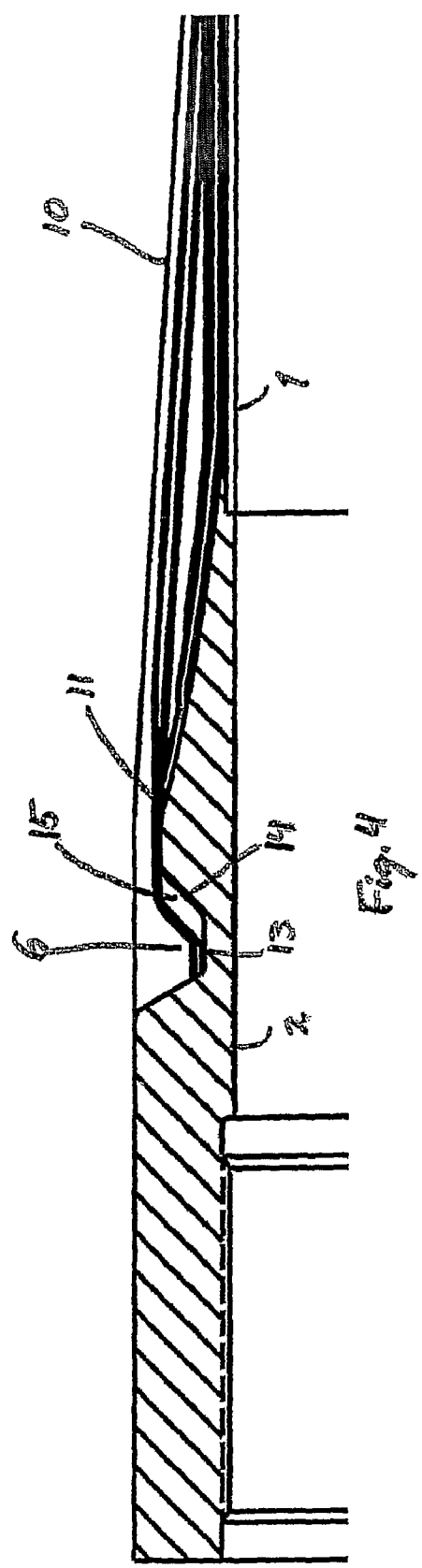

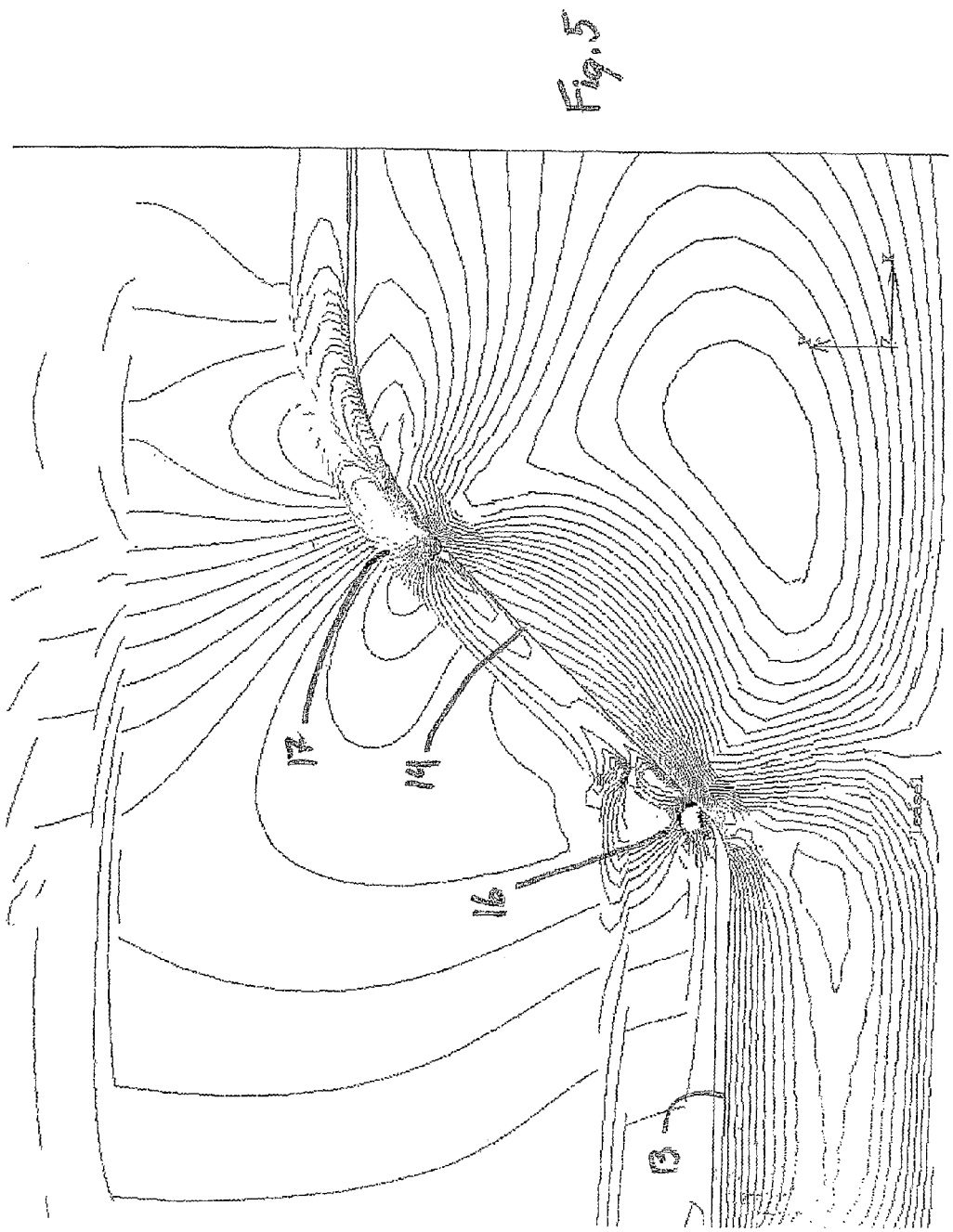

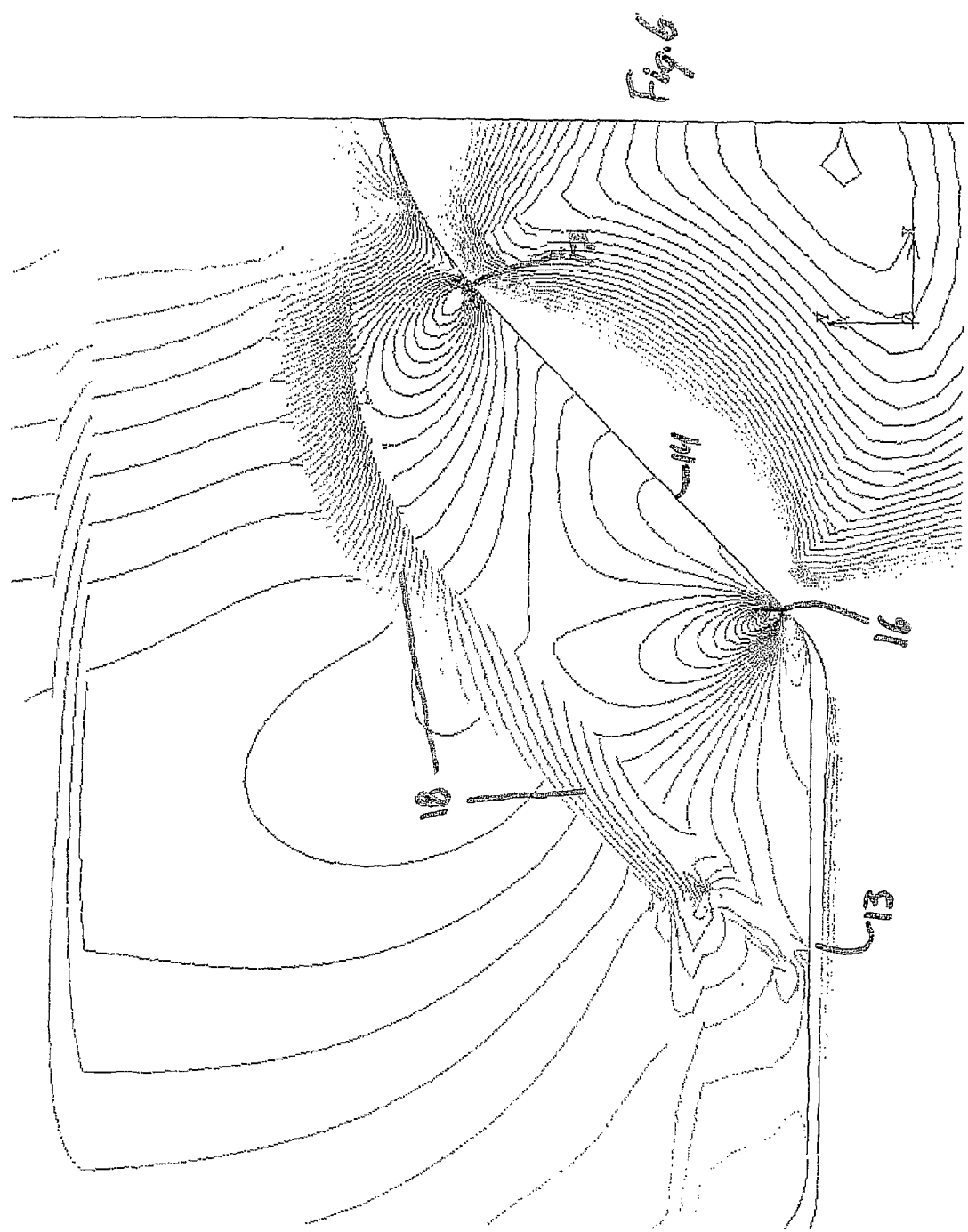

COMPOSITE PIPE AND A METHOD OF MANUFACTURING A COMPOSITE PIPE

The present invention regards a pipe such as a riser consisting of metal end pieces and a central section that principally comprises composite material, in accordance with the preamble of the appended claim 1.

This type of compound riser is described in greater detail in US Patent Applications no. US 2003/0106685 A1 and US 2003/0107186 A1, and U.S. Pat. Nos. 6,042,152, 6,050,612.

As the exploration and production of oil and gas moves into deeper waters, the weight, cost and reliability of the risers become increasingly important.

Risers are used on offshore oil production platforms for carrying oil or gas from the seabed up to a production platform. The risers may be flexible or rigid. Rigid risers are also used as conductor casings for drilling operations where the drill bit and the drill string run down through the drilling riser, and also for maintenance of oil wells (workover riser).

A composite riser is a rigid riser to replace today's rigid steel risers. The main purpose of compound risers is to reduce weight. Risers may also be made from titanium or aluminium. They are constructed as pipes with a diameter of approximately 4.5" to 21", and each section has a length of 15 to 27 meter. Each end has a mechanical coupling with a sealing system. The riser is assembled by interconnecting a series of sections. Risers are made with pressure ratings of up to 15000 psi (1000 bar) and lengths of up to 10000 feet (3000 m).

Composite risers also have high specific strength and rigidity, they are corrosion resistant, have good thermal insulating properties, superior dampening and excellent fatigue properties.

In principle, a composite riser is constructed like a metal riser, but the pipe section between the couplings is replaced wholly or in part by composite.

The present invention may be used for all types of rigid or flexible risers made from carbon fibre composite with metal terminating pieces. However, the invention is also suitable for other types of tubular components in which the composite material is to be coupled to metal parts, such as rocket nozzles, space and aviation components, windmill wings etc.

The composite consists of fibres that can accommodate forces in one direction only. Consequently, composite materials are constructed with alternating axially and tangentially oriented layers. The composite is attached to the steel in a metal grooving system called Metal to Composite Interface or MCI.

The way these pipes are constructed today, a metal end piece is connected to either end of a thin metal pipe. This is a relatively low strength metal pipe and is primarily intended to serve as a barrier between the fluid to be transported through the pipe and the composite material outside. Then axial carbon fibres are laid from a respective groove in one metal end piece to a respective groove in the other metal end piece. If there are several grooves in each end piece, axial carbon fibres will first be laid between the bottoms of those grooves in the two end pieces that are located closest to each other. Carbon fibres will be then be laid in the peripheral direction of these grooves until they have been filled. Next, axial carbon fibres will be laid between those grooves in each end piece that are located further away from each other, filling these in the peripheral direction. This is continued until all the grooves have been filled with composite material. The carbon fibres that are laid in the axial direction may, prior to application, be wetted with epoxy or another resin in order to form a so-called prepreg. The carbon fibres that are laid in the peripheral direction in the grooves effect a locking of the axial carbon fibres, thus preventing these from slipping out of the grooves during manufacture.

Such a composite pipe can withstand large axial forces. Nevertheless, there is a desire to increase the axial rupture strength of such pipes, particularly if the strength can be increased without causing any significant increases in the weight and/or wall thickness of the pipe. The present invention provides a considerable increase in the rupture strength without necessitating any increase in weight or dimensions. The present invention also provides an opportunity for reducing the weight and/or wall thickness while maintaining the rupture strength.

The invention will now be explained in greater detail with reference to the accompanying drawings, in which:

FIG. 1 shows a composite pipe constructed in accordance with prior art;

FIG. 2 shows a composite pipe in accordance with the present invention;

FIG. 3 shows a detail of the known pipe in FIG. 1;

FIG. 4 shows a detail of the pipe of the invention in FIG. 2;

FIG. 5 shows the load distribution in a section of the known pipe in FIG. 1; and FIG. 6 shows the load distribution in a section of the pipe of the invention in FIG. 2.

The known pipe in FIG. 1 comprises an inner metal pipe 1, the first end of which is coupled to a metal end piece 2, and the second end of which is coupled to a metal end piece 3. Each end piece comprises threaded portions 4 and 5, respectively, which allow further coupling to threaded pieces for connecting to other pipes or to equipment. The threaded portions 4, 5 shown are both female threads. This is because the pipe is made for test purposes (which also applies to the pipe in FIG. 2). A pipe intended for use in a riser will have a female thread at one end and a male thread at the other.

Each end piece 2, 3 has at least one groove 6 and 7, respectively. The parts of the end pieces 2, 3 closest to the inner pipe 1 exhibit a taper 8 and 9, respectively. Outside the inner pipe 1, in the radial direction, there is constructed an outer pipe 10 comprising carbon fibres in a mould of epoxy or other resin. The outer pipe 10 generally has longitudinal carbon fibres 11 and carbon fibres 12 generally arranged in the peripheral direction of the pipe 10.

Reference is now made to FIG. 3, which shows a detail of the pipe in FIG. 1 at the first end piece 2. As can be seen from the figure, longitudinal carbon fibres 11 have been laid, extending from the bottom 13 of the groove 6, up along the flank 14 of the groove 6 and on down along the inner pipe 1. These carbon fibres extend to the bottom of the corresponding groove 7 in the other end piece 2, where they are laid in a similar manner. The groove is then filled with carbon fibres 12 extending in the peripheral direction of the pipe, thereby locking the longitudinal carbon fibres 11 in the groove 6. Advantageously, these peripheral fibres are also wound around the outside of the outer pipe 10 along the entire length of this. Additionally a thin membrane made of for instance rubber, may be provided between the metal parts, i.e. the inner pipe 1 and the end pieces 2, 3. This acts as a vapour barrier.

FIG. 2 illustrates a pipe in accordance with the present invention. This pipe also comprises an inner pipe 1, two end pieces 2 and 3 having respective grooves 6 and 7. Here there are also longitudinal carbon fibres 11 and peripheral fibres 12 laid outside the inner pipe 1 and partly outside the end pieces 2 and 3. There is just one small difference between this pipe and the known pipe in FIG. 1, and this difference is best seen in FIG. 4, which shows a section of the pipe at the first end piece 2. Here the longitudinal fibres 11 are also laid in the bottom of the groove 6. However, they are not laid up along the flank 14. Instead, there is an intermediate layer 15 at the flank, preferably comprising peripheral carbon fibres in an epoxy or other resin mould. This results in the longitudinal fibres 11 being spaced from the flank 14. This intermediate layer entails a reduced requirement for peripheral fibres 12 outside of the longitudinal fibres 11, thus causing no change in the overall consumption of materials. In this instance the thickness of the intermediate layer 15 was 10 mm. The appropriate thickness will depend on the dimension of the grooves, thus large grooves will require a thicker intermediate layer. The appropriate thickness will probably be in the range 2 mm to 25 mm, most probably in the range 5 to 20 mm.

This intermediate layer at the flank 14 has proven to have a significant effect on the axial rupture strength. A pipe having an internal diameter of 10" (approx. 25 cm) and being constructed in accordance with FIG. 1 and a pipe with the same dimensions constructed according to FIG. 2 underwent comparative testing through the pipes being stretched in the axial direction until rupture occurred. Both pipes had the same amount of longitudinal carbon fibres and the same amount of peripheral fibres. The only difference was that some of the peripheral fibres had been arranged inside of the longitudinal fibres at the flank 14 in the groove 6, and similarly in the groove 7, instead of outside the longitudinal fibres.

The results were as follows:
Pipes of conventional construction in accordance with FIG. 1:
Rupture at a force of 2215 kN.

Pipes constructed according to the present invention, with an intermediate layer in accordance with FIG. 2:
Rupture at a force of 3131 kN.

Both pipes had an approximately linear force gradient up until rupture. However, the difference in rupture strength was as much as 41%.

FIG. 5 shows a diagram of shearing stress represented by isobars. It shows a typical situation for a pipe of the conventional construction according to FIG. 1 placed under tension. The bottom 13 and the flank 14 of the groove 6 can be seen in the figure. The isobars can be seen to be very closely spaced in an area 16 at the transition from the bottom 13 to the flank 14, and in an area 17 near the top of the flank 14. This indicates a high stress concentration in these areas, due to steep gradients in the contact pressure between the steel and the composite material at the point of initial engagement between these materials. The longitudinal fibres pass through these areas 16 and 17 (the arrangement of the fibres 11 can be seen from a somewhat higher stress concentration along the fibres 11) and are thus subjected to very high stresses.

FIG. 6 shows a diagram of stress represented by isobars, in a typical situation for a pipe according to the present invention, such as shown in FIG. 2, placed under tension. The bottom 13 and the flank 14 of the groove 6 are also visible here. The arrangement of the longitudinal fibres 11 can be discerned from a somewhat higher stress concentration in an area 18. However, this area 18 is outside the areas 16 and 17, which definitely have the highest stress concentrations. Consequently, the longitudinal fibres 11 are not subjected to these high stresses. As the tension in the pipe increases, the extent and intensity of areas 16 and 17 will also increase. However, it will take much longer before these stress areas reach an extent and intensity that will overload the longitudinal fibres 11.

The intermediate layer 15 can be built up by laying webs of resin wetted fibre webs (so-called prepreg) on the flank 14 in the peripheral direction of the pipe. As a result of the prewetting, the webs stick together, adhering to the end piece 2, 3 to a certain extent. Advantageously, the application takes place during rotation of the pipe. After the intermediate layer 15 has been built up the longitudinal fibres 12 are applied. In this case the pipe can be rotate very slowly while the fibre feeder travels rapidly in the longitudinal direction. Alternatively the axial fibres can be applied in the form of prepreg webs. Then more fibres are laid in the peripheral direction, both in grooves 6 and 7 and on the rest of the pipe between grooves 6 and 7.

The figures and the text refer to one groove in each end piece. Naturally it is possible to use several grooves. So far, up to 6 grooves have been used for each end piece. In this case, fibres will first be laid in the groove located furthest away from the free end of the end piece, then in the groove furthest away but one, etc. Although it is highly advantageous to apply an intermediate layer on all the flanks of the grooves situated furthest away from the free end of the end piece, placing such an intermediate layer on the flanks of only one or a few of the flanks will also help achieve an increase in rupture strength.

The above refers to the use of carbon fibres for constructing composite pipes. However, an increase in rupture strength can also be found for pipes constructed from other types of fibres such as fiberglass and aramide fibres. Thus the invention can also be applied in those cases where it is deemed desirable or appropriate to manufacture a pipe or tubular component made wholly or in part of other types of fibres.

The invention claimed is:

1. A composite pipe having at least one metal end piece with a free end and a groove indented into its outer surface and a non-metallic tubular component, wherein the non-metallic tubular component is coupled to the at least one end piece opposite of the free end of the end piece, at the groove which the non-metallic tubular component engages, the non-metallic tubular component comprising generally axial directed fibres extending down into the at least one groove, which groove has a bottom and a flank, and which flank is located furthest away from the free end of the end piece, characterized in that an intermediate layer of material is provided between the flank and the axial fibres, having a thickness that separates the axial fibres from substantially the entire length of the flank and from less than the entire bottom of the groove, and by an amount that changes stress concentration areas in a pipe subjected to axial tension and increases axial rupture strength of the pipe, wherein, when the pipe is placed under tension, the intermediate layer is subject to higher stress concentrations than the axial fibers.

2. The composite pipe according to claim 1, characterized in that the thickness of the intermediate layer is between 2 and 25 mm, preferably between 5 and 20 mm.

3. The composite pipe according to claim 2, characterized in that the intermediate layer comprises fibres extending generally in the peripheral direction of the pipe.

4. The composite pipe according to claim 2, characterized in that the intermediate layer comprises a softer material than that of the end piece.

5. The composite pipe according to claim 1, characterized in that the intermediate layer comprises a softer material than that of the end piece.

6. The composite pipe according to claim 1, characterized in that the axial fibres, and possibly also the intermediate layer, comprise carbon fibres, and that the fibres are located in an epoxy or other resin mould.

7. The composite pipe according to claim 1, characterized in that there are fibres outside of the axial fibres, which fibres extend generally in the peripheral direction of the pipe, for causing the axial fibres in the at least one groove to be locked in place.

8. A method of manufacturing a composite pipe having at least one metal end piece with a free end and a groove indented into its outer surface and a non-metallic tubular component, where the non-metallic tubular component is coupled to the at least one end piece opposite the free end of the end piece, at the groove that the non-metallic tubular component engages, which groove has a bottom and a flank, and which flank is located furthest away from the free end of the end piece, comprising:

applying an intermediate layer of material at the flank, having a thickness that separates the axial fibres from substantially the entire length of the flank and from less than the entire bottom of the groove by an amount that changes stress concentration areas in a pipe subjected to axial tension and increases axial rupture strength of the pipe and which, when the pipe is placed under tension, the intermediate layer is subject to higher stress concentrations than the axial fibers, subsequently laying axial fibres along the intermediate layer, and then winding fibres on the outside of the axial fibres in the peripheral direction of the pipe.

9. The method according to claim 8, further comprising:
providing the intermediate layer by winding fibres along the periphery of the flank.

10. The method according to claim 8, further comprising:
wetting the fibres, prior to application, in an epoxy or other resin mould, and,
wherein the fibres are carbon fibers.

* * * * *